United States Patent [19]
Assalita et al.

[11] Patent Number: 5,118,154
[45] Date of Patent: Jun. 2, 1992

[54] GRIPPING ASSEMBLY

[75] Inventors: Edward J. Assalita, Abbottstown; Stephen L. Heiser, York, both of Pa.

[73] Assignee: AMP Incorporated, Harrisburg, Pa.

[21] Appl. No.: 686,069

[22] Filed: Apr. 15, 1991

[51] Int. Cl.[5] .............................................. B66C 1/28
[52] U.S. Cl. ...................................... 294/86.4; 901/45
[58] Field of Search .................... 294/86.4, 88, 103.1; 901/45, 49

[56] References Cited

U.S. PATENT DOCUMENTS

| | | | |
|---|---|---|---|
| 2,093,658 | 9/1937 | Hildenbrand | 294/103.1 X |
| 3,824,674 | 7/1974 | Inoyama et al. | 294/86.4 X |
| 4,540,211 | 9/1985 | Masserang | 294/88 |
| 4,676,541 | 6/1987 | Lord et al. | 294/86.4 X |
| 4,830,565 | 5/1989 | Bucher et al. | 294/86.4 X |
| 4,915,574 | 4/1990 | Park et al. | 901/49 X |

FOREIGN PATENT DOCUMENTS

48194  2/1990  Japan .................................. 901/45

Primary Examiner—Margaret A. Focarino
Assistant Examiner—Dean J. Kramer
Attorney, Agent, or Firm—Allan B. Osborne

[57] ABSTRACT

A gripping assembly (30) for use with a robotic arm (12) in withdrawing articles (16) from a molding machine (14) is disclosed. The gripping assembly (30) includes an L-shaped block (24) slidingly attached to a gripping mechanism (10) and biased therefrom by coil springs (26) positioned therebetween.

1 Claim, 8 Drawing Sheets

GRIPPING ASSEMBLY

FIELD OF THE INVENTION

The invention disclosed herein relates to a device used with "pick and place" robotic equipment to remove molded articles from a molding machine.

BACKGROUND OF THE INVENTION

In some molding operations, the molded articles are ejected from the molding machine directly into a bin or the like. In other molding operations, the molded articles are partly ejected, gripped by a gripping mechanism attached to one end of a robotic arm, removed from the machine and transferred to another location. Many contemporary gripping mechanisms are operated pneumatically and the article ejector in the molding machine is hydraulically driven. This creates a mismatch problem because of the reaction time of each mechanism; i.e., if the coordination between the two is off, a frequently occurring event, the article may be gripped incorrectly and perhaps suffer enough damage to cause its rejection at a later time. Accordingly, it is now proposed to provide a gripping assembly which provides lost motion to avoid a mis-match condition.

SUMMARY OF THE INVENTION

According to the invention, a gripping assembly is provided which includes an L-shaped block having a leg which is slidingly attached to one side of a gripping mechanism and a base which crosses an end thereof. Coil springs positioned between the base and the end of the gripping mechanism resiliently biases the two apart while allowing reciprocal motion of one relative to the other.

BRIEF DESCRIPTION OF THE PRIOR ART

Figure 1:
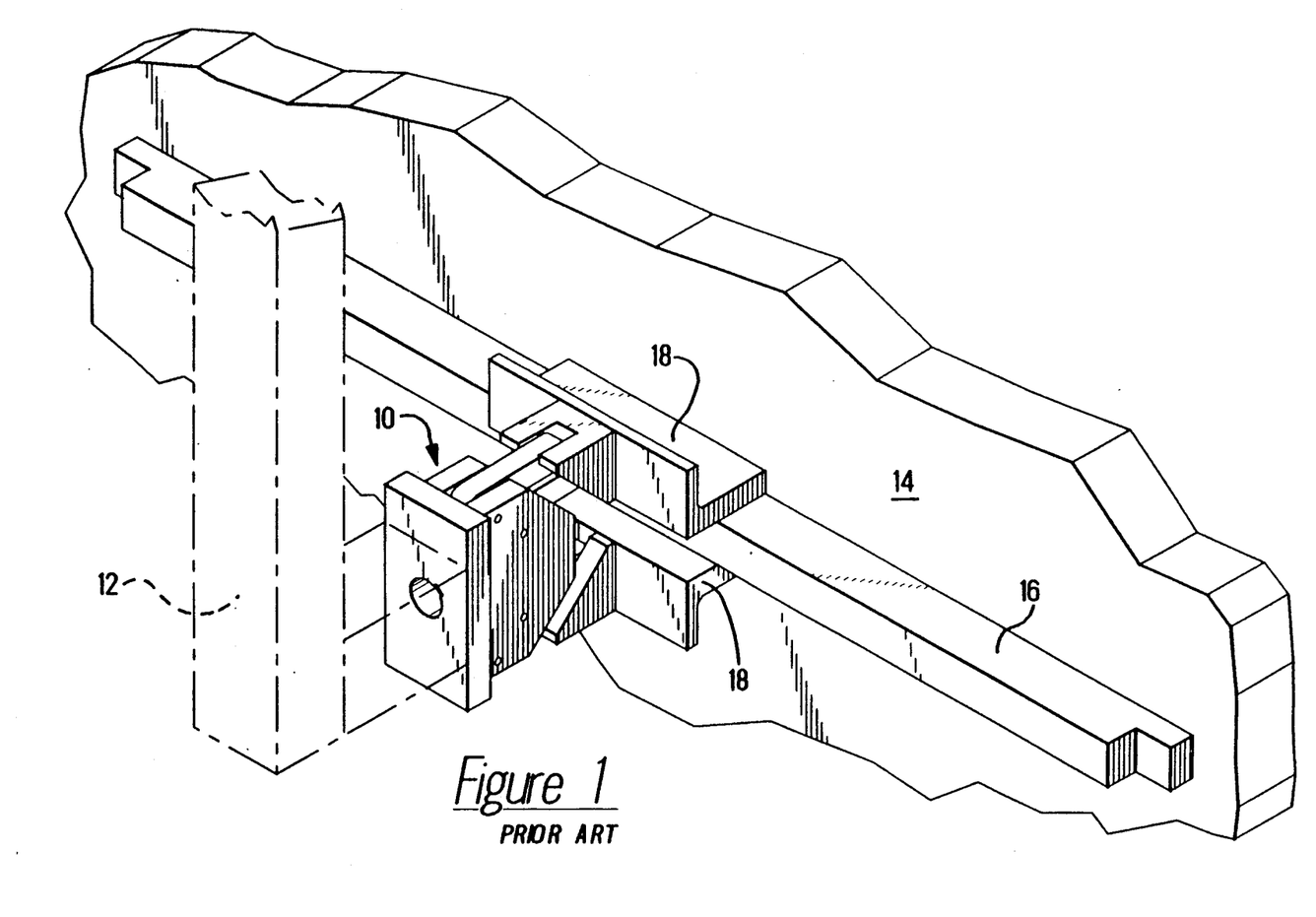
FIG. 1 is a view of the prior art gripping mechanism.

As indicated in FIG. 1, gripping mechanism 10 is attached directly to robot arm 12. Thus, the movement of mechanism 10 is unforgiving and reacts directly in response to the movement of arm 12 which is pneumatically driven. The result that sometimes occurs is that the advance of mechanism 10 towards molding machine 14 is out of sync with the hydraulically driven mold mechanism (not shown) which is ejecting article 16 from machine 14. Article 16 then may be incorrectly gripped between gripper plates 18 and perhaps damaged substantially.

DESCRIPTION OF THE INVENTION

Figure 2:
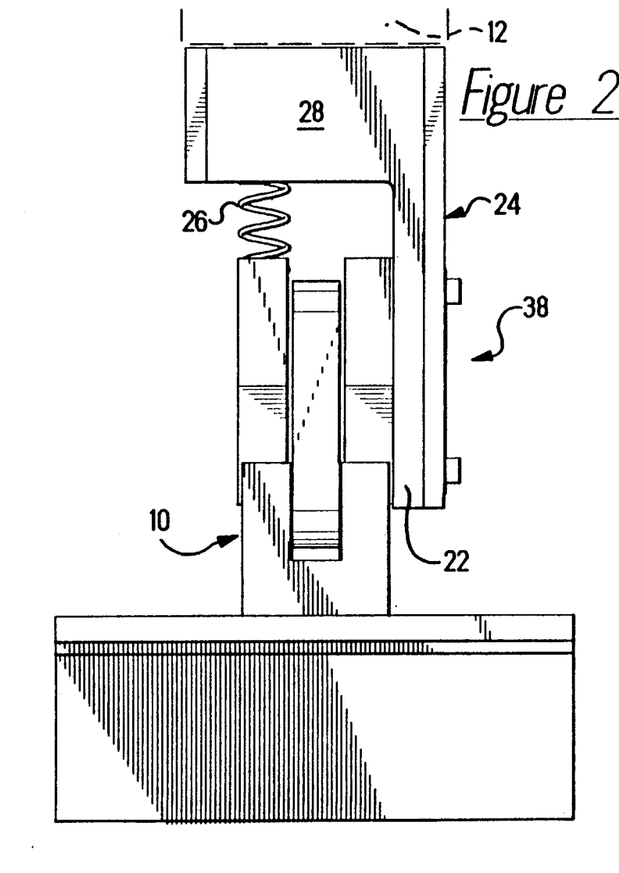
FIG. 2 is a top plan view of the gripping assembly of the present invention.

FIG. 2 shows the essence of the invention; i.e., gripping mechanism 10 is spring mounted to arm 12. Thus the relation between mechanism 10 and arm 12 is a resilient one which allows mechanism 10 to absorb mismatching between it and the ejecting mechanism (not shown) in molding machine 14.

Figure 3:
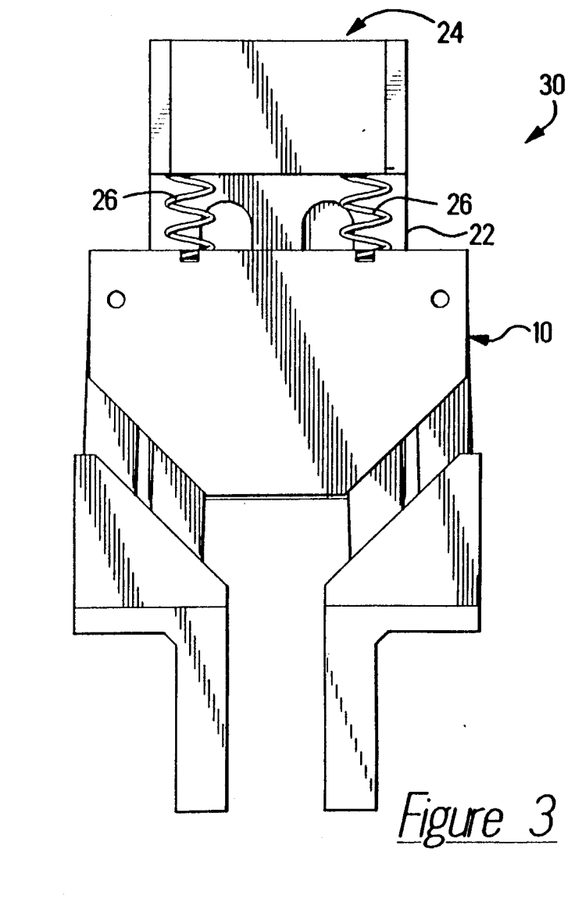
FIG. 3 is a side view of the gripping assembly.

More particularly gripping mechanism 10 is slidingly mounted to leg 22 of L-shaped block 2 and coil springs 26 are positioned between mechanism 10 and base 28 of block 24. FIG. 3, a side view, shows that two coil springs 26 are preferably used.

Gripping assembly 30 includes gripping mechanism 10, block 24 and coil springs 26.

Figure 4:
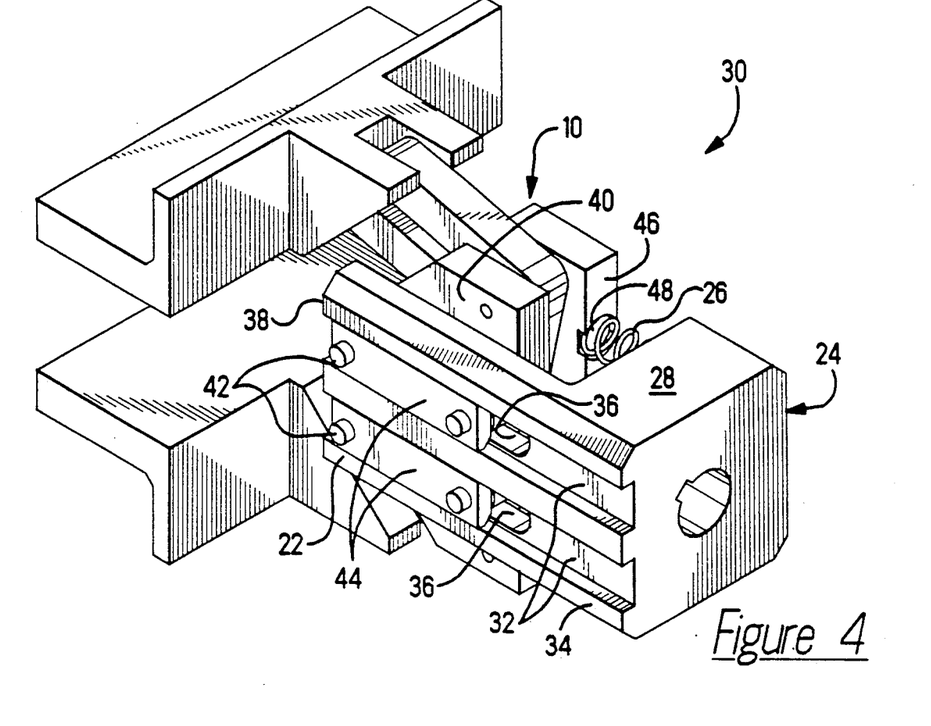
FIG. 4 is a view showing the gripping assembly in an open state.
Figure 5:
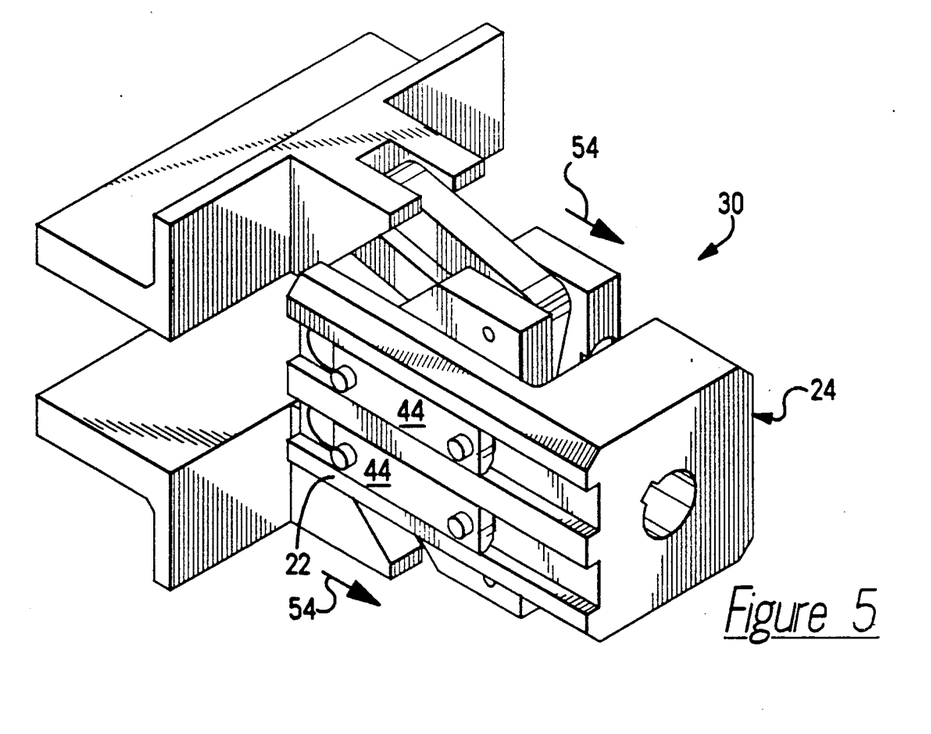
FIG. 5 is a view showing the gripping assembly in an open-compressed state.

The details of leg 22 are shown more clearly in FIGS. 4 and 5. A pair of parallel grooves 32 extend along the outside surface 34 of leg 22 and elongated slots 36 extending therethrough are provided in each groove 32 near free end 38. Leg 22 is slidingly attached to side 40 of gripping mechanism 10 by bolts 42 passing through spacer plates 44 and through slots 36 and into threaded apertures (not shown) in side 40. Base 28 crosses over end 46 of mechanism 10 and can move towards or away therefrom by reason of leg 22 being slidably mounted to side 40.

Springs 26, received in respective apertures 48 in mechanism 10 (one shown) and base 28 (none shown), resiliently bias mechanism 10 and block 24 apart but permits the aforementioned reciprocal motion as indicated by arrows 54 in FIG. 5.

Figure 6:
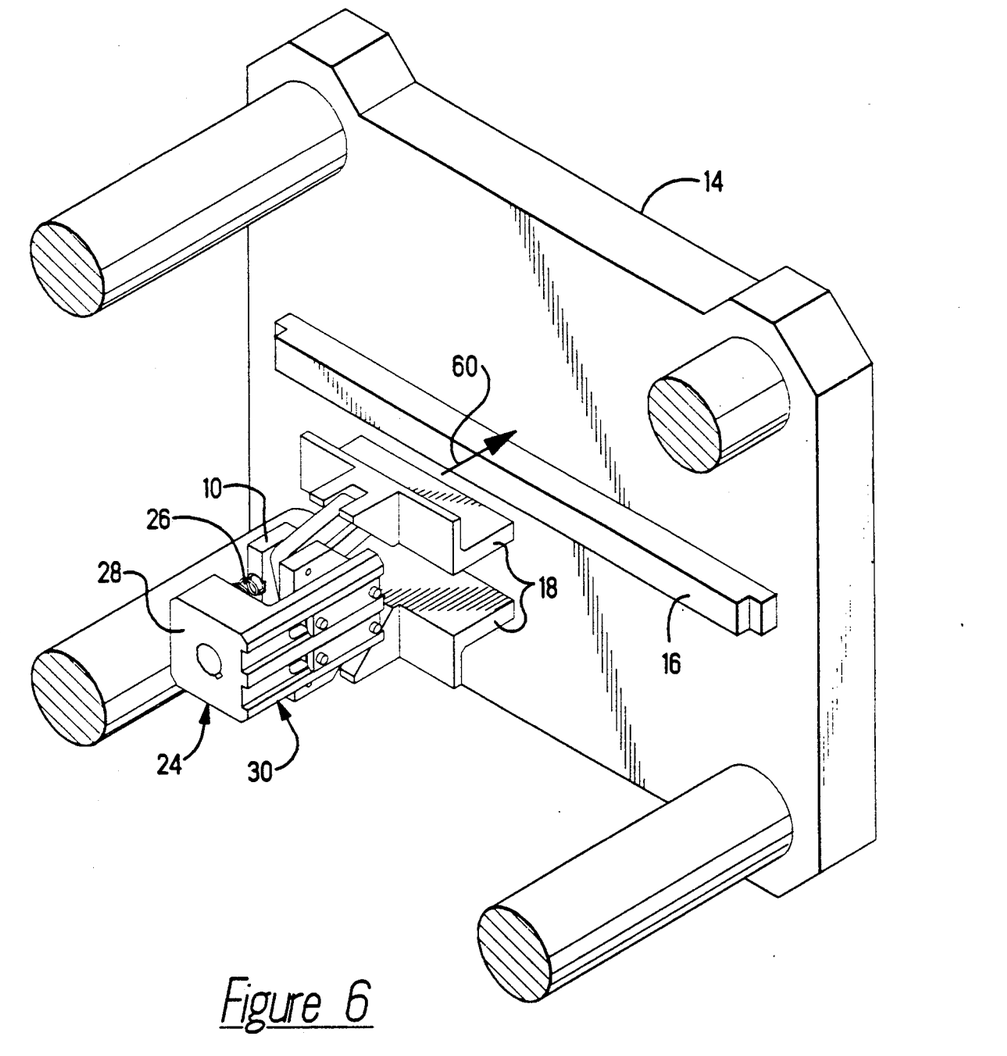
FIG. 6 is a view showing the gripping assembly being advanced towards a molded article.

FIGS. 6–10 illustrate the steps in removing article 16 from molding machine 14. In FIG. 6, gripping assembly 30 is being moved towards machine 14 as indicated by arrow 60. Gripper plates 18 are open and mechanism 10 biased away from base 28 of block 24 by coil springs 26.

Figure 7:
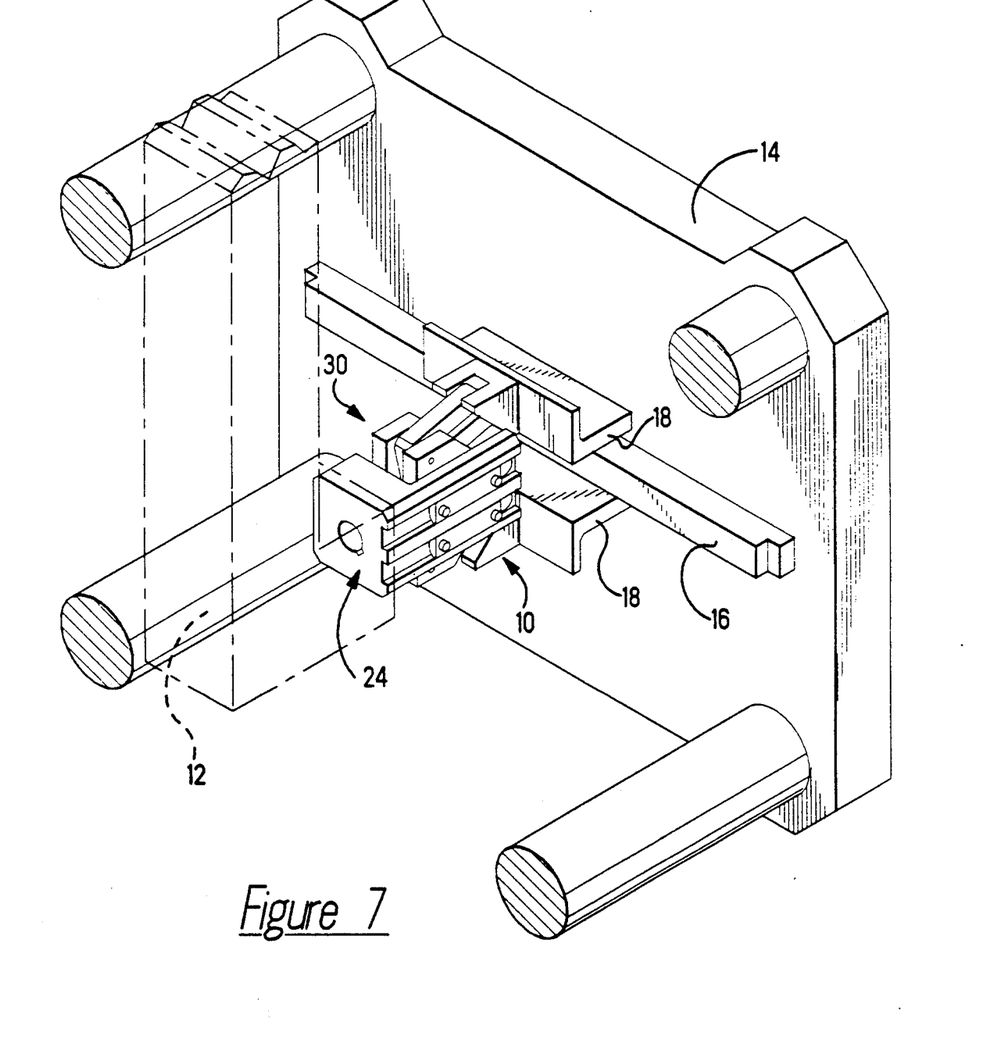
FIG. 7 is a view showing the gripping assembly in position to grip the article.
Figure 8:
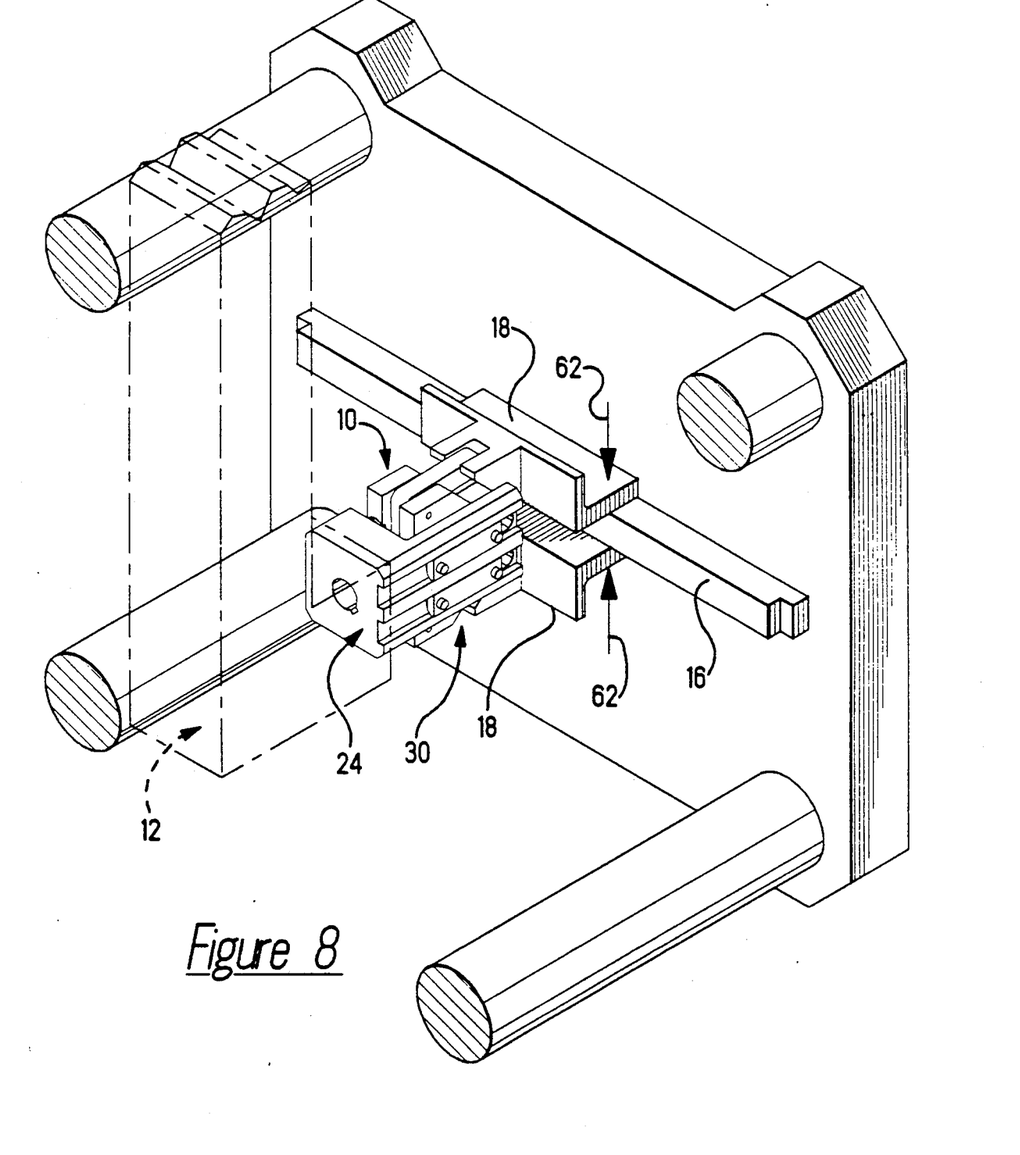
FIG. 8 is a view showing the article being gripped.

As shown in FIGS. 7 and 8, robot arm 12 moves towards machine 14 with plates 18 bracketing and closing in onto article 16 as it is being ejected from machine 14. Arm 12 then backs away from machine 14; however, if article 16 is being ejected at a speed faster than arm 12 is moving, springs 26 compress to compensate for the different speeds and a potential mis-match is avoided.

Figure 9:
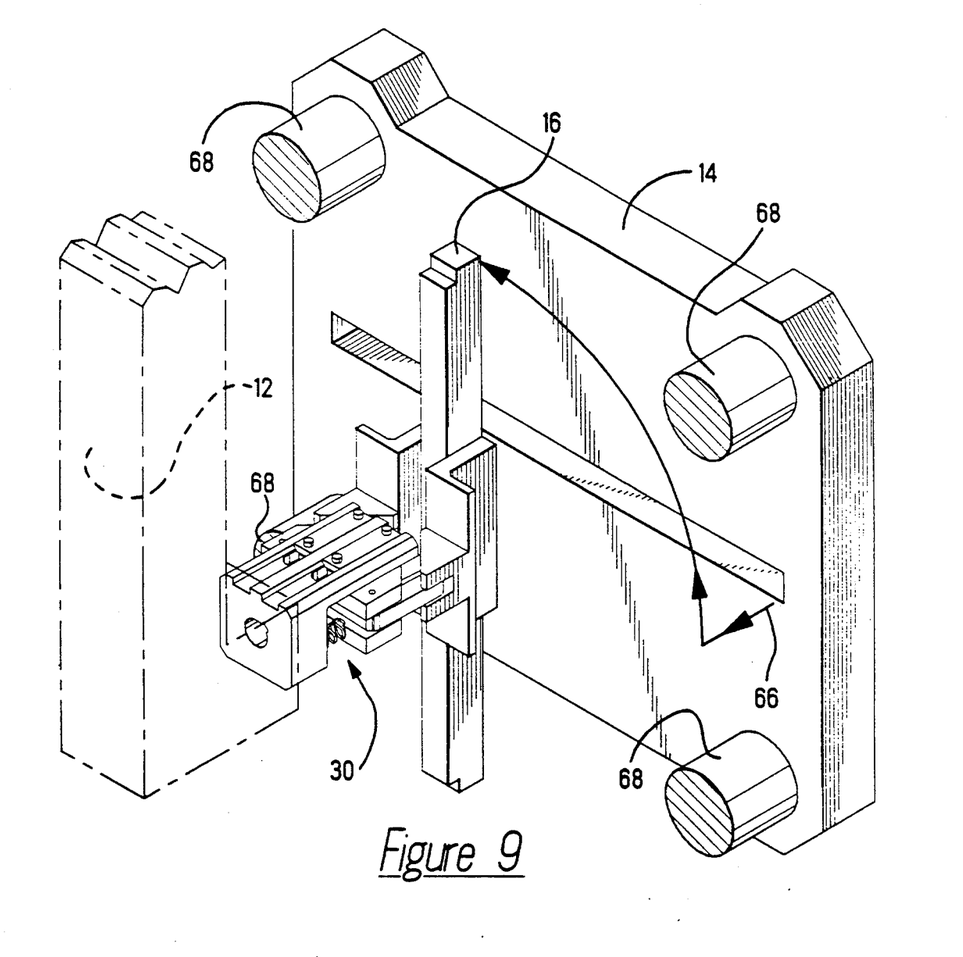
FIG. 9 is a view showing the article being rotated.

The operations shown in FIG. 9 are first the withdrawal of article 16 from machine 14 as indicated by arrow 66. This is done by backing arm 12 away. The next step is the ninety degree rotation of gripping assembly 30 and article 16 to orientate article 16 so that its length is normal to the axis of support shafts 68 which are part of machine 14.

Figure 10:
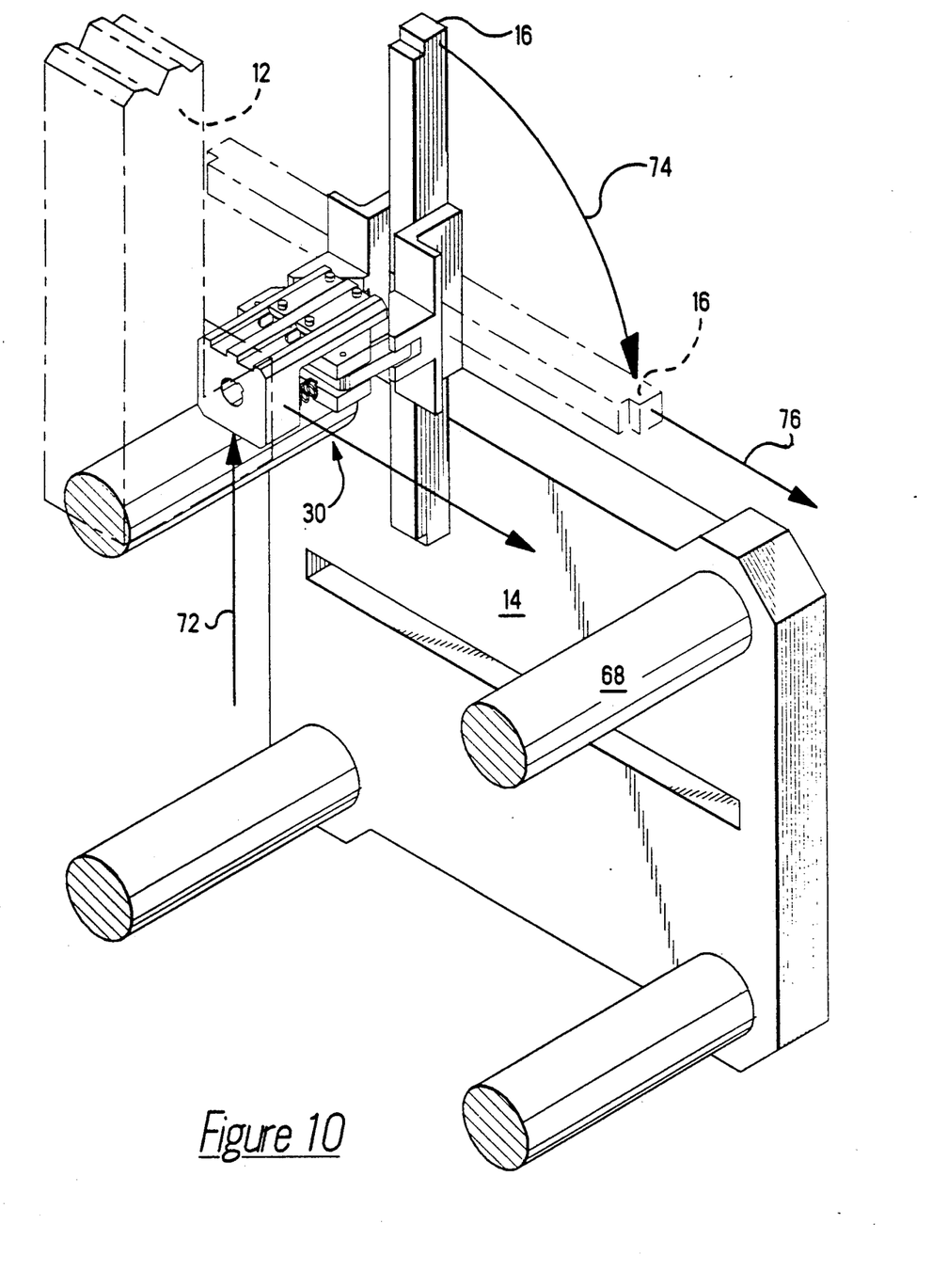
FIG. 10 is a view showing the article lifted upwardly for disposal away from the molding machine.

Three operations are shown in FIG. 10. As indicated by arrow 72, article 16 is lifted towards the top of machine 14. Article 16 is then rotated ninety degrees as indicated by arrow 74. In the last step as indicated by arrow 76, article 16, still gripped by gripping assembly 30, is moved to one side of machine 14 for deposition in a container (not shown) or the like. The step of rotating article 16 shown in FIG. 9 is needed to lift it up as shown in FIG. 10 since the length of article 16 is greater than the space between shafts 68. Obviously, gripping assembly 30 and arm 12 need to be above shafts 68 in order to move article 16 away from machine 10 laterally.

We claim:
1. A gripping assembly for use with a robotic arm in removing molded articles from a molding machine, said gripping assembly comprising:

a gripping mechanism having closable plates at one end for gripping an article being ejected from a molding machine;

an L-shaped block having a base and a leg extending outwardly from said base, said leg being provided with a longitudinal groove and a spacer plate slidably positioned in said groove and a longitudinal slot in said groove and extending through said leg with a bolt passing through said plate and slot whereby said block is slidably attached to one side of said gripping mechanism with said base crossing and spaced from a second end of said gripping mechanism, said block being adapted for attachment to a robotic art; and coil springs positioned between said gripping mechanism and said base of said block for resiliently biasing said mechanism and block apart while permitting reciprocal motion of one relative to the other.

* * * * *